United States Patent
Beckerman

(10) Patent No.: US 6,820,483 B1
(45) Date of Patent: Nov. 23, 2004

(54) ELECTRONIC WATER SOLUTION LEVEL DETECTOR

(75) Inventor: Howard Beckerman, Shrewsbury, NJ (US)

(73) Assignee: Mechanical Ingenuity Corp., Shrewsbury, NY (US)

( * ) Notice: Subject to any disclaimer, the term of this patent is extended or adjusted under 35 U.S.C. 154(b) by 0 days.

(21) Appl. No.: 10/662,229

(22) Filed: Sep. 15, 2003

(51) Int. Cl.[7] .................................................. G01F 23/00
(52) U.S. Cl. .................. 73/304 C; 73/304 R; 73/290 R
(58) Field of Search ........................... 73/304 C, 304 R, 73/290 R

(56) References Cited

U.S. PATENT DOCUMENTS

| | | | |
|---|---|---|---|
| 3,462,353 A | | 8/1969 | Every |
| 3,779,265 A | * | 12/1973 | Hart .............................. 137/93 |
| 3,996,579 A | * | 12/1976 | Dahl ............................ 340/521 |
| 4,284,951 A | * | 8/1981 | Dahl et al. .................... 324/430 |
| 4,512,857 A | * | 4/1985 | Chamberlin ................. 205/512 |
| 4,625,201 A | | 11/1986 | Berry |
| 4,957,828 A | * | 9/1990 | Garron ......................... 429/92 |
| 5,132,626 A | * | 7/1992 | Limuti et al. ................ 324/432 |
| 5,580,439 A | * | 12/1996 | Baucke et al. ............... 205/782 |
| 6,040,079 A | | 3/2000 | McMurren |

* cited by examiner

Primary Examiner—Hezron Williams
Assistant Examiner—Rodney T. Frank

(57) ABSTRACT

A simple non-moving passive electric probe detects the height of a solution along its surface. Liquid resistance and thin water films are disregarded and setting of the liquid level is accomplished electronically without moving the probe. An output signal proportional to the height of a solution along the probe length is provided. Means are disclosed electrically pierce though oil films, soap foams or grease layers that can coat a probe, preventing contact with the solution. The system will sense distilled water, city water, sewage, wine, milk, soda, juice, alcohol, latex paint or any other water based solutions.

5 Claims, 2 Drawing Sheets

ELECTRONIC WATER SOLUTION LEVEL DETECTOR

BACKGROUND OF THE INVENTION

This invention relates to a simple non-moving passive electric probe along with circuitry to detect the height of water-based solutions on its surface. The probe operates in areas where other level sensors such as floats, optical or ultrasonic types cannot operate reliably. These would include areas where high flow rates, significant liquid agitation, or air and liquid foaming make other sensors ineffective. Such areas would include inside pipes, and pumped wastewater or sewage tanks.

Sewage or sump applications can be troublesome due to the presence of oils, fats or other non-conductive hydrocarbons. Oils will usually float on the surface of the water and have high surface tension. They can coat the surface of the sensing probe such that it will no longer make connection with the water underneath. This invention includes a means to break this film allowing the probe to continue working.

The most popular, and not coincidentally, the least expensive form of liquid level sensing is the float control. It consists of a body that will float on water with either an enclosed tilt switch or an embedded magnet that moves with the float to make or break a switch contact. Its disadvantage is it must move to work. If the float is subjected to the force of the water or is thrown around like a boat on a rough sea, false activations are common. If it pounds against the sides of its container or the pump's steel case it will eventually break apart, leak, and sink. In sewage applications sticky, slimy, disgusting items will become entangled in its cord or wrap around its bearing surfaces, drying and hardening like a rock, preventing long term reliability without periodic cleaning.

Water resistance sensing is a well-known means of detecting a water level. Its disadvantage is that it only detects the presence or absence of water and does not produce a true level signal output. It must be set to sense the highest resistance water it is likely to encounter (5-megohms) and this leads to another problem. Once water wets its sensing areas, a thin water film remains behind and continues to conduct. Even if the water film completely evaporates conductive salts or oxides will remain behind continuing to supply resistance. As such, these problems limit this technology to non-critical applications.

Other than floating or resistance sensing mentioned above there is a whole range of liquid level detectors that include capacitive, ultrasonic, magnetic, crystal, optical, resonant, and oscillating types. These means generally depend on a relatively quiet, flat, non-agitated water surface for their reliable operation.

The technical field of this invention relates to the science of electrical charges in water-based solutions including redox reactions, galvanic cells, and electrolytic cells. Some limited explanation here will clarify this inventors understanding of the relationship between the area wet on a conductive probe, voltage and current in water reactions. This is explained in terms of electricity not chemistry due to the author's primary area of expertise.

In FIG. 1, place a cast iron pump (1) and a copper probe (14) in pure, distilled non-conductive water (15), and a spontaneous negative voltage will be present on the Iron (1) and a positive voltage will appear on the copper probe (14). Since the water is not conductive, electrons themselves cannot make the trip from copper to iron. Remove the copper probe, insert an aluminum probe and the voltage reverses, a spontaneous positive voltage will be present on the iron and a negative voltage will appear on the aluminum. This reaction between dissimilar periodic conductive elements is well known and referred to as a dielectric effect.

Powering this whole process is the oxidation of the negatively charged electrode, in the Iron-Copper example; the iron visibly rusts, combines with oxygen and generates the electrical energy. Remove the copper probe and insert a magnesium probe and the polarity, chemistry reverses, the magnesium visibly rusts, and the iron stops rusting. Remove the waters access to air and the process stops, the voltage falls to zero, no current generates and rusting stops. Oxidation occurs at the iron-water interface and reduction occurs at the water-copper interface; this is termed a redox reaction.

Connect the iron pump to the magnesium probe with an external wire and an electrical current will flow. Allow this current to flow for some time and magnesium will be plated onto the surface of the iron. This inventor hypothesizes that a particle with a positive charge left the magnesium leaving electrons behind and traveled through the water to the iron. In addition, because electrons are not carrying the charge through a conductor the process is much slower than the speed of light. This is evidenced by the speed of the build up of voltage and current on the probe.

A chemically generated, electrically motivated, particle is mechanically traveling, moving charges through non-conductive water. Likened to a Van De Graph Generator where a non-conductive moving rubber belt carries electrical charges from a conductive ground to a conductive sphere. Similarly, electrical charges taken from the surface of a grounded iron pump travel through a non-conductive solution and change the charge on a copper probe. Like the Van De Graph generator, the voltage produced rises as time elapses gathering more and more electrical charges on the opposite electrode.

Surprisingly, and unlike the Van De Graph generator, this reaction's voltage self limits at very low and very specific voltages, usually less than 2-volts. The limiting voltage is independent of solution conductivity, the distance between the electrodes and the level of the water and totally dependent on the electrode materials themselves. This effect is well known and even categorized in tables of electro negativity. The voltage should have continued to increase towards infinity as more and more charged particles moved through the solution but something stops it. The example, iron-water-copper reaction quickly builds to 0.62-volts and then stops.

It is reasonable to assume the process limited itself when the aforementioned charged particles in the water stopped moving. Stacking up, waiting to get at a limited surface area they back up all the way to the source electrode and stop particles from leaving. Charged particles will not leave the source electrode if the solution is already full of particles at the same potential, since like charges repel. The critical voltage noted must be equal to the electrical force required to stop these particles from moving or leaving their source. Once this electromotive force has been achieved the reaction is at equilibrium where no new particles are created, no particles move through the solution, and none are collected. The electromotive force required to stop the reaction is different for each differing set of electrode elements. This inventor concludes that the voltage is not indicative of how fast the reaction proceeds, just how much force is required to stop it.

I supposed that electrodes that produced higher voltages would also produce higher currents; this was not necessarily the case. Some conductive electrodes produced high voltages but once shorted through a current sensor developed very little current flow. This inventor hypothesizes that while the voltage indicates the force stopping the reaction the current signifies how fast the reaction is proceeding; or how many charged particles per second make the trip through the solution. Current flow increases by shortening the distance between the dielectrics, or by increasing their surface area. This seems to support the hypothesis.

This inventor concludes that more surface area allows more particles per second access to the solution at the source electrode and allows more particles per second access to the receiving electrode. With the dielectrics open circuited more surface area shortens the time interval to reach the critical voltage where the reaction stops. Shortening the distance between the dielectrics does not allow more particles access but shortens their travel time and thereby increases the electrical current.

Once the dielectrics short circuit, to measure the current, the electromotive force, (voltage) stopping the reaction disappears. Electrons backed up in the source electrode, FIG. 1 (1) surge through the wires (5 & 9) and current sensor (12) to the positively charged particles stacked up on the dielectric probes (14) surface. The peak of this surge is indicative of how many charged particles can intimately touch the dielectric probes surface well enough to make an electrical connection. Since the particles have a like charge they will not touch each other and repulsion will limit the number of available parking spaces on the dielectric probe (14). The number of parking spaces for the charged particles is dependent on the surface area of the electrodes, therefore the peak current surge is also dependent on surface area. After some short time interval, the built up particles are depleted and the current falls after the initial surge to some steady state value.

The distance between the dielectrics affects the current only after the initial surge has ended. Continuous current production with a fixed area probe depends on the distance between the dielectrics and varies in roughly a linear fashion. Halving the distance will produce somewhat less than twice the current. This author concludes that there are two ways to use these observable facts to ascertain the surface area of an electrode inserted into a water solution; periodically measure the surge current or measure the continuous current from probes at a fixed distance.

The surface area of a round rod dielectric is its circumference times the length of water touching it plus that little circle at the bottom. The circumference is fixed and as the water level gets higher on the rod, the surface-area of contact varies, linearly with the rods length. If the electrode were rectangular, with fixed width and thickness the surface area of contact with rising water will also vary, linearly with its length. Fins, hollow or porous electrodes would increase the current because the surface area is increased. Electrodes of varying shape make the current sensor's signal output (13) follow the surface area's changes as the water rises over the probe's (14) surface features.

Continuous current measurement has other limitations beyond fixed distance operation. The Redox processes will not self-limit, or stop, because voltage between the probes is zero due to the production of current. Oxidation (rusting) of the negative electrode will occur rapidly to supply the energy to power the movement of electrical charges. Plating can occur if both dielectrics are metal, eventually coating the positive probe's surface completely and stopping the reaction. The air to water surface may not be sufficiently large to absorb enough oxygen to power the process continuously and a steady reduction in current will occur. Therefore, one aspect of this invention has the probe out of solution until the solution rises to touch a specific quantity of its surface. Circuitry then engages a pump removing the solution and the probe remains out of the solution most of the time.

Sampling the surge current is the most accurate, reliable, and somewhat more expensive mode of measurement contemplated by this invention. In this mode, the probe is submerged but disconnected most of the time. In this manner, it is able to maintain a naturally occurring voltage limiting the rusting and/or plating reaction. Periodically a switch is closed for a few microseconds to measure the current. The peak current will be linearly proportional to the solution's contact area with the probe. Thereafter to get the average water level the current peaks are averaged, to get the peak water level the current is measured at the peak, and to get the lowest water level it is simply necessary to look at the minimum current.

The Redox reaction requires the presence of dissolved oxygen and the reaction will stop if oil coats the surface of the water or if a closed airtight container is used. Oils float on the surface of solutions and quickly cover that surface preventing air from entering. Oil has high surface tension and coats the surface of a conductive probe such that it will no longer make an electrical connection with the solution. Luckily, the Redox reaction is unnecessary and even dielectric probes are unnecessary for the following aspect of this invention to work.

Two conductive probes of identical materials can inject a small, externally applied, electrical charge into a water solution. The water will accept and store some portion of such a charge for a long time and the same electrodes that created it can recover it. This mode does not use dielectrics to create polarized particles, external power is used and circuitry limits its magnitude and duration. The peak surge current of the recovery will be proportional to the surface area shared by the probes. The total current recoverable will be less than the charge placed into the water and will not relate to the surface area of the probes. This inventor hypothesizes that this process charges water molecules therefore, the same limitations of parking spaces on the electrodes occur as when dielectrics were present.

Injection of an electrical charge into a solution should be limited in time and magnitude or undesirable irreversible effects will occur. The worst of these is that water will break down into hydrogen and oxygen gas. Other effects worth noting include the wearing away of the electrodes due to corrosion or electroplating and saline solutions produce significant chlorine in the presence of an electrical current. This invention therefore limits the injected charge and then immediately recovers the charge, removing it from the solution.

Injecting a fast, brief, sharp voltage into a probe has a side benefit in that it will break an oil film allowing the probe to contact the water. The force created by an electrical charge on an oil film coating the probe is expressed as the force between polarized charges;

$$F = K \frac{Q_1 Q_2}{d^2},$$

where K is a constant, $Q_1$ is the charge on the probe, $Q_2$ is the charge on the water and the distance (d) is the thickness of the oil film. As the probe sinks into the water any oil coating gets thinner, and the factor "d" of the equation approaches zero. Therefore, the force "F" on the film rapidly becomes infinitely high. For example, when the oil thickness changes from 1-inch to a film 1/1000-inch thick the force on it from a fixed charge has increased 1,000,000 times. The waters pressure, oils floatation forces, and oil's surface tension all work to cause the oil to become just a bubble thin film coating on the probe and thereby easy to rupture with the force produced by a small electrical charge.

A thin film of liquid will eventually coat all the surfaces of a container, especially a closed container. FIG. 1 depicts this film graphically as item 20 and FIG. 3 as item 40. Evaporation from a warm solution condenses on the surface of a cooler container's surface or the filling and emptying of the container will leave this film. Solutions such as milk, latex paint or sewage will always leave behind such a film. Dielectrics will produce their naturally occurring limiting voltage in the presence of this film and such voltage will not be different than immersing the probe fully in the solution. The electrical current measurements as documented in this invention will accurately reflect the thickness of this film on the probe.

DESCRIPTION OF THE PRIOR ART

Resistance sensing (conductivity) is not applicable to disclosures made in this document. In this invention, varying conductivity between electrodes will not cause its output signal to render a response indicative of the presence or level of water. Only a water solution will do that. Short-circuiting the probes in this invention, zero resistance, will have no effect, as the sensing probe is always at ground potential while making measurements of electrical current. Therefore all prior art that is based on conductivity is not relevant to this application.

The technical field of this invention relates to using the oxidation-reduction reactions of dissimilar metals to sense the level of a water solution. One of the means used by this invention has the dissimilar metals short-circuited to ground potential and measures the resulting current. This electrical current establishes the water's level. There simply does not seem to be much prior art using this particular methodology.

Stretch the term water solution to include electrolytes and electrolyte level sensors might be applicable. The test to determine whether patents of this genre are really conductivity sensors is to connect the probes together out of the solution. If such produces a positive indication of electrolyte level then it is essentially a simple conductivity tester measuring a highly conductive liquid.

To this end we refer to U.S. Pat. No. 6,040,079 from 2000 "Battery Electrolyte Level Indicator" in which a probe is used to light a lamp when electrolyte touches it. A probe is connected to a lamp through a resistor to the battery terminal, and when the probe touches the electrolyte the lamp illuminates. This is a conductivity sensor. Also in U.S. Pat. No. 4,625,201 from 1986 "Emergency Battery Cell Monitor" a Tungsten probe is connected to a relay through a resistor to the battery terminal. When the probe touches the electrolyte the relay activates. This is also a conductivity sensor.

Corrosion control art, using electrodes and reverse polarization has some minor common points but never implements a level control system as a result of their configuration. To this end we refer to U.S. Pat. No. 3,462,353 from 1969, "Reference Electrodes in Anodic Corrosion Control". In particular, FIG. 21 has an elemental Carbon probe in pickle juice along with a temperature versus voltage chart for the half cell thus formed. In FIGS. 34 & 35 a steel probe in sodium hydrosulfate at 420° F. data seems to suggest a current density in ma/in$^2$ versus voltage. But the probes are not shorted because there is a voltage measured, and nowhere is claimed or stated any reference to level sensing. To be inline with the physical properties of the invention at hand the chart would need to relate ma versus in$^2$ of probe surface in the solution.

SUMMARY OF THE INVENTION

A conductive probe is used to detect water or a water based solution along its surface. Connected circuitry disregards the liquid's resistance, charges the probe to disregard oil, soap foam or grease, and will even sense distilled water.

The level sensing operates from the natural properties of water solutions. In one embodiment a cast iron pump case is used as one element and a carbon/graphite probe is used as the second element. These two periodic elements form essentially an iron-carbon electrochemical primary cell in the presence of water. Grounding the pump's case forms the reference electrode, while the carbon probe, connected with a wire to the circuitry forms the sensing electrode. The iron to water and then water to carbon reaction will produce a positive potential on the sensing, carbon electrode. The galvanic cell, thus formed, will begin to produce an electromotive force even in non-conductive or distilled water.

The flow of this electromotive force, its ability to conduct an electrical current, will be proportional to the surface area of contact of the water on both the probe and the grounded element. The grounded element, an iron pump, pipe, or tank has much more surface area than the probe such that the surface area of the water on the probe is the main current limiting entity.

The invention connects the probe to the reference electrode and measures the current produced. Such current is directly proportional to the amount of surface area shared by the dissimilar metals.

DETAILED DESCRIPTION OF THE INVENTION

Figure 1:
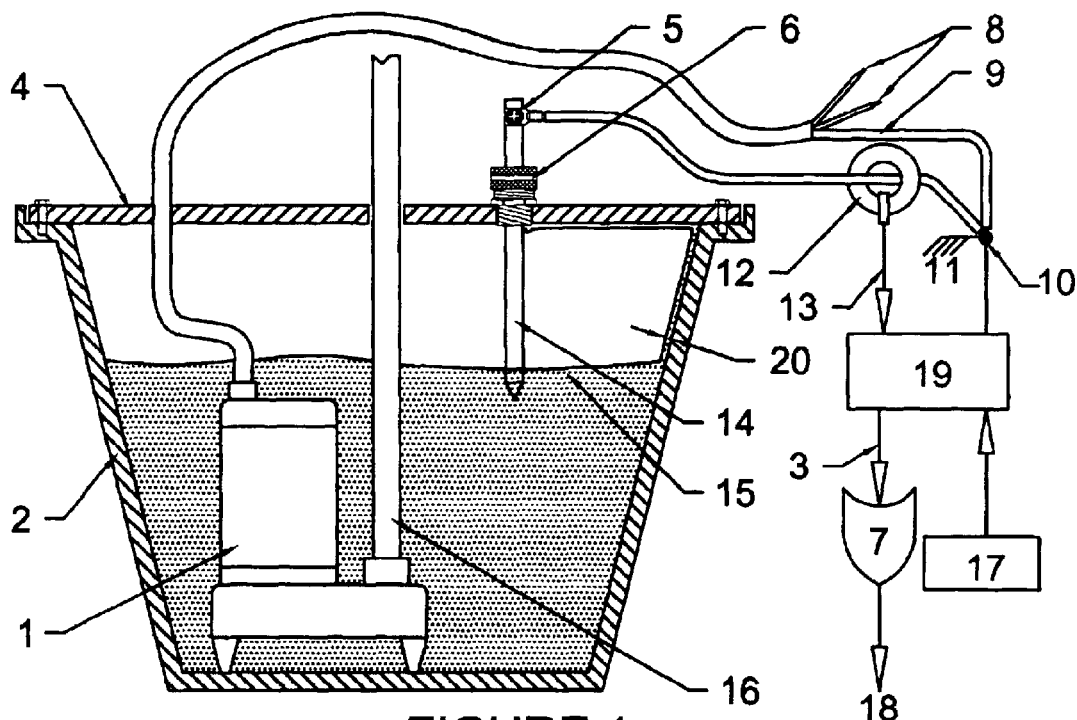
FIG. 1 depicts the invention's implementation in a tank using momentary immersion and continuous mode current measurements to derive a solution's level.

The following refers to FIG. 1. A pump (1) inserts into a pit (2) with a cover (4) and liquid ejection pipe (16). The pump (1) has a power cord with at least three wires, two wires (8) connect to the motor, and one wire (9) connects to the pump case. In this example, the pump case is cast iron, but it could easily be stainless steel or even plastic if its impeller or shaft were steel. Once the iron pump case (1) contacts the water solution (15) a voltage will exist between the iron and the water. The iron case connects through wire (9) to an electrical ground (11). The iron case is then said to be at zero volts or ground. The water will spontaneously have a +0.44 volt charge on it with respect to ground. This is a naturally occurring phenomenon known as a dielectric reaction.

An electrode (14) either made out of, or coated with, a dissimilar conductive element inserts into the solution i.e. through the cover (4). A fastening means (6) allows adjustment of the probes depth into the tank. A wire connects the electrode at (5) through a DC current sensing means (12) to ground potential voltage at node-10. If a carbon/graphite electrode is used, once it touches the water it will try to develop the +0.44 volt charge from the iron-water interface on it and an additional +0.38 volt charge from the water-carbon interface or a total of +0.82-volts.

If the particular system has a steel pump and a positive probe potential is desired then the probe's surface must be made of, or coated with brass, copper, silver, carbon or gold. These are in order; brass making the least voltage and gold the highest. A negative probe potential requires a zinc, aluminum, or magnesium probe or coating. These are in order; zinc making the least negative voltage and magnesium making the most negative voltage. However, the probe material itself must not eventually corrode and fall off in caustic environments. This has led to some experimentation and a conclusion that the best probe material is carbon/graphite, it simply will not corrode, it is inexpensive and comes in rods, tape, paint, and can be electro-deposited.

In the example the carbon electrode is at ground potential, a voltage cannot develop and electrical current flows between the dielectrics. The current sensor (12) measures this current and produces an output signal (13) proportional to the liquid's level (15) on the electrode (14). An external power source (17) powers the circuitry so as not to load the voltaic cell thus created. A comparator (19) compares the liquid level signal from (12) the current sensor, to a set point and creates a new signal (3) indicative of that level being above or below such set point. This signal enables a run timer (7) that in turn enables signal (18) starting the pump with a relay. The run timer will keep the signal (18) present for some preset time after the liquid level drops below the probe (14) to prevent the rapid cycling of the pump.

There are three distinct modes of measurement operations envisioned in this invention; continuous mode, sampling mode and charge-sample mode. The example depicted in FIG. 1 is the continuous mode whereby the current sensor (12) continuously measures the current, but the level sensing probe (14) remains out of solution for most of the time. Once the solution (15) rises to touch a specific quantity of the probe (14) surface, the pump energizes removing the solution. There will be some current generated by solution films (20) that develop on the surfaces of the container but by adjusting the set point of comparator (19) such currents are kept well below the trip point. Once the probe touches the main body of the solution the current increases beyond the subtracted current and the pump starts.

Figure 2:
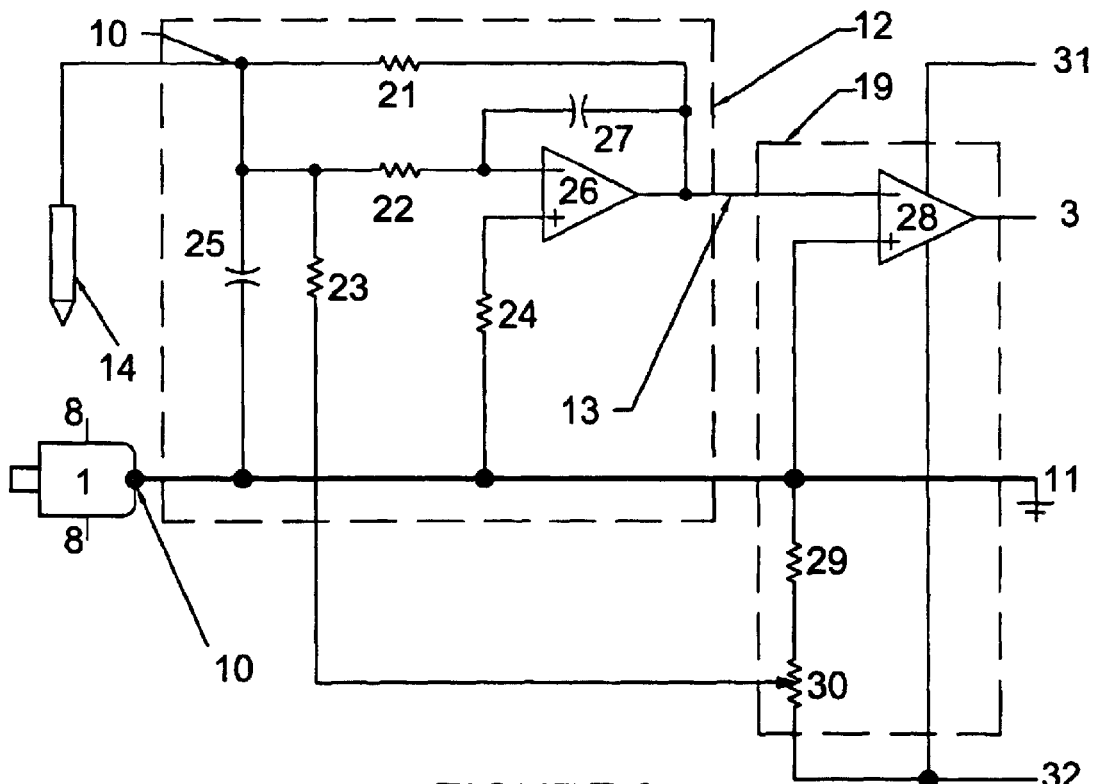
FIG. 2 shows a preferred embodiment of the current measurement means and comparator means.

FIG. 2 shows a preferred embodiment of the current sensing means (12) and the comparator means (19). The op-amp (26) will keep node-(10) at ground potential and its output voltage (13) will be inversely proportional to the solution level on the probe (14). A power supply (17) applies a positive voltage at node-(31) and a negative voltage at node-(32) with respect to ground (11). Resistor (24) references the op-amps (+) input to ground while resistor (22) references its (−) input to node-(10). The op-amps output will change through resistor (21) to keep its (−) input equal to its (+) input, and due to this configuration at ground potential. Resistor (21) determines the gain of the op-amp such that if it is set at 100K, and +10-ua presents itself at the probe (14), the op-amp will provide a negative 1-volt at its output (13), thereby keeping the node-(10) and probe (14) at ground potential.

The capacitor (27) placed in the feedback loop averages the current input and filters out AC sinusoidal noise signals. The capacitor (25) aids in reducing DC noise transients such as static electricity. Resistors (21 & 22) also isolate the op-amp (26) from high frequency and high voltages that may appear on the probe. This allows a low frequency and thereby low cost op-amp to operate in noisy environments. In addition, if the motor's rubber power cord were to crack, exposing a live 240-volt wire to the solution and therefore the probe, these resistors limit the current, i.e. to 2.4-ma if R21 and R22 are 100K. The op-amp typically has built in voltage clamping diodes on its inputs that can easily handle this magnitude of current.

The comparator means (19) uses another section of the op-amp (28) and once again has its (+) input referenced to ground. It compares ground with the signal (13) output coming from the current sensor (12). The trip point is thereby set as zero volts referenced to ground. The potentiometer's (30) wiper feeds a negative current into the current sensor's summing node-(10) through resistor (23). This arrangement causes the op-amp's output (13) to go in the positive direction to keep node-(10) at ground potential. The resistor (23) limits this negative current so as not to exceed the positive limit of the op-amp's output (13), and resistor (29) sets some minimum offset current such that the op-amp's output (13) will always be somewhat above ground. It is of value for an installer to connect his voltmeter from point (13) to ground, reading the liquid's level and know the trip point is zero volts. This allows him to set the offset without having to make two readings, i.e. the level and the set point.

Figure 3:
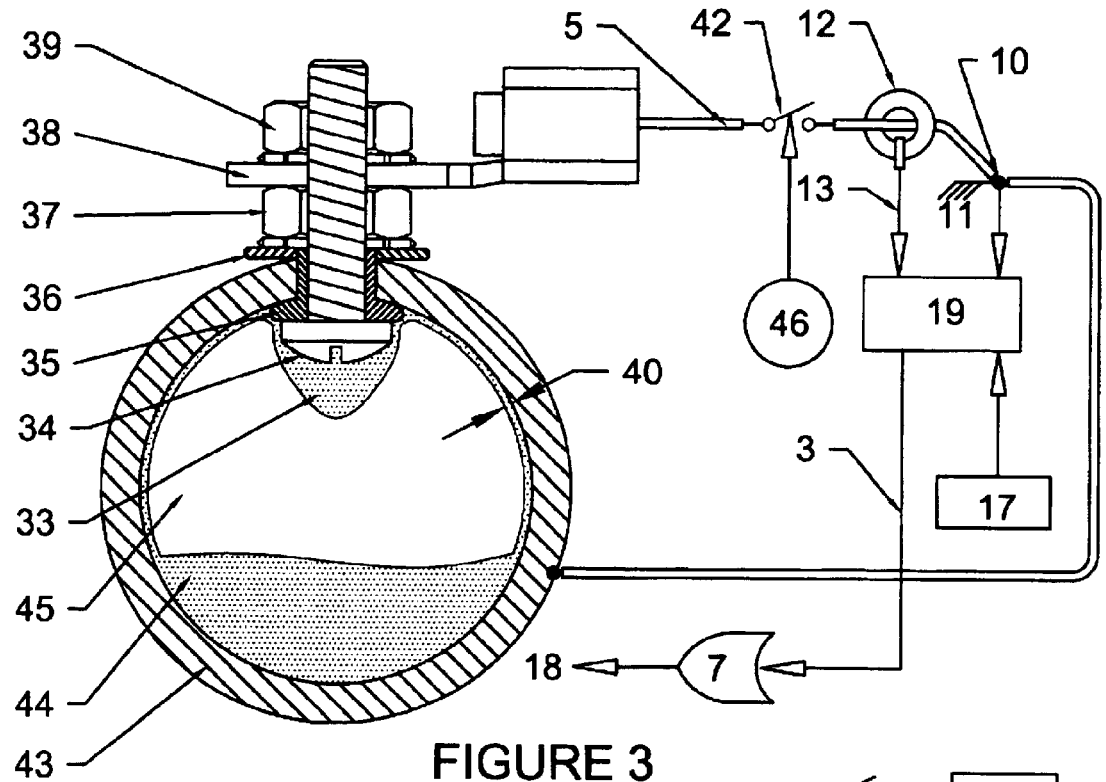
FIG. 3 illustrates the inventions implementation in a pipe using continuous immersion and sampling mode current measurement.

Converting the continuous mode to sampling mode just requires the addition of a switch and some circuitry that periodically closes the switch. FIG. 3 shows the invention modified for use inside a pipe (43) that turns off a pump if the solution level falls at its inlet. The solution (44) normally submerges the probe (34) continuously and therefore switch (42) configures the invention to sampling mode. It involves periodically sampling the current and using its peak value to determine solution depth. If the pipe is copper, the probe (34) can be steel or stainless steel. A nut (37) compresses an insulating grommet (35) and insulating washer (36) to form a watertight seal. Another nut (39) compresses a wire lug (38) to establish an electrical connection between the probe (34) and the wire (5).

Switch (42) connects the wire (5) to the current sensor (12) periodically, i.e. for 20-us every 20-ms, and is driven by circuitry (46). The switch (42) is a low voltage, field effect transistor, with low on resistance, in the preferred embodiment. The current sensor (12) presents its signal (13) to a comparator (19). Comparator (19) compares the liquid level signal from (12) the current sensor, to a set point and creates a new signal (3) indicative of that level being above or below such set point. This signal enables a run timer (7) that in turn disables signal (18) stopping the pump through a relay. The run timer will keep the signal (18) present for some preset time after the liquid level drops below the probe (34) to allow the pump some specific time to prime.

There will be some current generated by solution films (40) that develop on the surfaces of the pipe once air (45) displaces the liquid, but by adjusting the set point of comparator (19) such currents are kept well below the trip point. Once the probe (34) and any solution held by surface tension (33) to the probe touches the main body of the solution the current increases beyond the set point and the pump can start.

Figure 4:
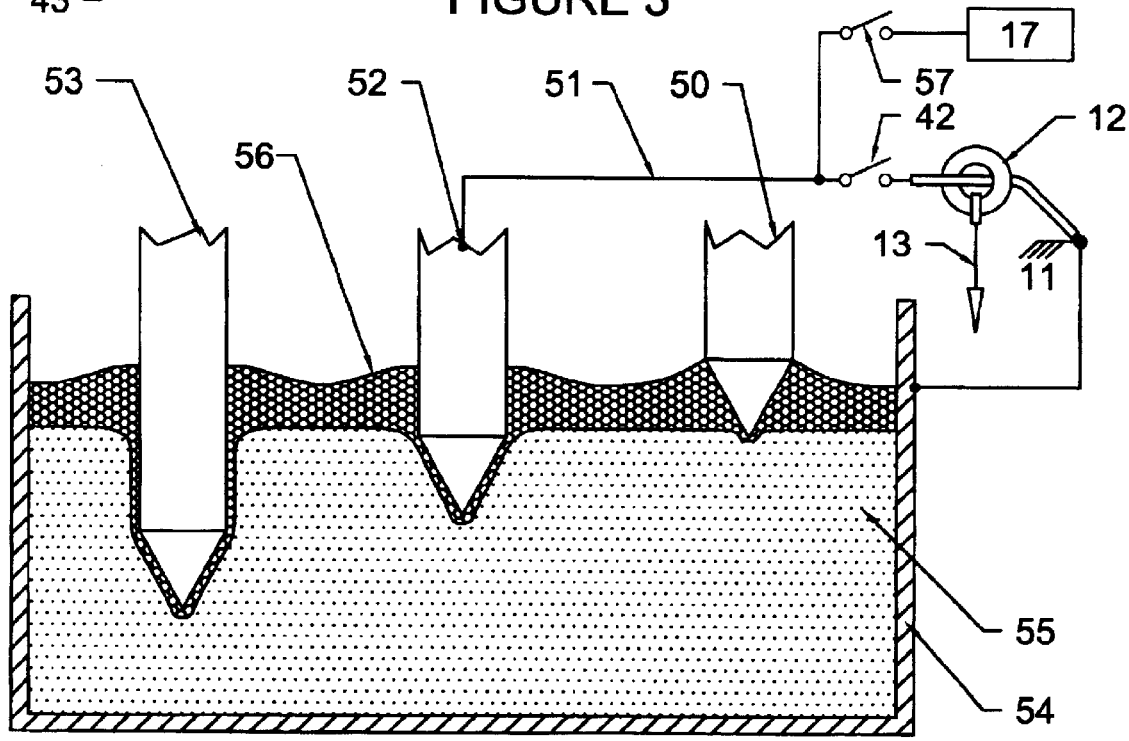
FIG. 4 depicts the breaking of an oil film and the injection of a charge into solutions with no dissolved oxygen.

This invention provides a method of allowing the probe to continue to operate normally in the presence of heavy layers of oil or in airtight closed containers. FIG. 4 shows in sequence the events that occur as the solution level rises with oil floating on the surface. The oil (56) is floating on the surface of the solution (55) cutting off its supply of oxygen and therefore dielectric properties will not work. In addition, the oil will coat the probes surface before it touches the water. As the water continues to rise the probe is below the water level but it is not making contact due to an oil film coating at (52). At (53) the probe is well below the water level but the oil continues to coat its surface preventing contact.

A wire (51) connected to the probe (52) is wired to switch (42) and switch (57). At time zero, both switches are open and closing both switches at the same moment is not allowed. When switch (57) closes, it subjects the probe and oil to a fast rising voltage from the power supply (17). The liquid within the container (54) is at ground or zero potential because the container connects to ground (11). Alternatively, the pump, or the pipes in the solution could ground the solution. The solution is thereby at a different voltage than the probe (52) and an electromotive force pulls the solution toward the probe. This is particularly true at the probe tip where the oil film is thinnest.

Solution pressure and the electrical charge will cause the oil to rupture and seek its original level. Therefore, when switch (57) closes it will rupture the oil film (56) at the probe (52) tip and expose the entire probes surface to the solution.

Switch (57) need only close long enough for the oil bubble to collapse, in the neighborhood of a microsecond. Leaving switch (57) closed for longer time will result in some transfer of charge to the solution. Switch (57) then opens and charging of the solution stops. Switch (42) closes a short time later gathering the stored charge and connecting the current sensor (12) to measure its peak current. Such peak current (13) will be proportional to the surface area of the solution on the probe. The current waveform will indicate a rapidly rising area initially that rounds off and falls to zero with time as the last of the charge exits from the solution.

Switch (42) must then open before switch (57) closes placing the next charge into the solution. Within the confines of this invention it is not possible to know, when or if an oil film has developed therefore the switches must periodically close just in case. The conductivity or chemistry of the solution will influence the current drawn whenever switch (57) closes but it will not influence the peak recovery current after (57) opens and switch (42) closes. Any charge recovered, once switch (42) closes, will be that which actually stores itself in the solution. Excessive charge or that charge which the solution cannot store will dissipate, either nicely as heat, or badly as a chemical reaction.

The peak recoverable current will thereby be dependent on the mutual surface area covered by the solution and not the size of the charge. If the solution is an electrolyte and the electrodes were dielectrics, thereby forming a battery, then perhaps all of the charge produced by the closure of switch (57) would be stored and recoverable. However, the peak current would still be limited by the surface area of those dielectrics even though the total current-time recoverable might be many times the peak. Therefore, the peak current is not related to the size of the charge, the solution's chemistry, or the solutions conductivity; just, the surface area of the solution on the probe.

Accordingly, there has been disclosed an improved level detector for a water solution. While exemplary embodiments of this invention have been disclosed, it is understood that various modifications to the disclosed embodiments are possible, and it is intended that this invention be limited only by the scope of the appended claims.

What is claimed is:

1. A level detector for a water based solution, comprising:

two electrical conductors, of different periodic electro-negativity, placed such that a rising solution will contact the surface area of both conductors;

an electrical current sensor arranged to produce an electrical signal indicative of the current generated by the two conductors in solution;

wires connecting the electrical energy produced by the conductors to the electrical current sensor;

a power source for the current sensor so as not to place a load on the conductors;

means for providing a reference signal representative of a desired current level; and means for comparing the electrical signal indicative of the current generated by the two conductors in solution to the reference signal and producing a third output electrical signal indicative of whether the current is above or below the desired current level.

2. The detector according to claim 1 wherein the reference signal is produced by summing a current from the power supply to offset the current generated by the two conductors.

3. The detector according to claim 1 further comprising:

a timer; and a relay;

wherein the timer is started by the third output electrical signal and the timer has a delay on break logic such that the timer signals the relay to make continuously whenever the third output electrical signal is present, and signals the relay to break only after removal of the third output electrical signal for a predetermined time interval.

4. The detector according to claim 1 further comprising:

means for periodically connecting the current sensor to one, or both, of the conductors.

5. A level detector for a water solution, comprising:

two electrically conductive elements placed such that a rising solution will contact the surface area of both elements;

a current sensor which may be selectively enabled and disabled;

wires connecting the conductive elements to the current sensor;

a power source;

means for applying periodic pulsed electrical energy from the power source to the conductive elements while the current sensor is disabled;

means for enabling the current sensor after such pulsed electrical energy is removed; and means for producing an electrical signal indicative of the current generated by the two conductive elements in solution while the current sensor is enabled.

* * * * *